US012220985B2

(12) United States Patent
Jang

(10) Patent No.: US 12,220,985 B2
(45) Date of Patent: Feb. 11, 2025

(54) DISPLAY AND COCKPIT MODULE FOR VEHICLE INCLUDING THE SAME

(71) Applicant: HYUNDAI MOBIS CO., LTD., Seoul (KR)

(72) Inventor: Kil Pyung Jang, Seoul (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 304 days.

(21) Appl. No.: 17/817,322

(22) Filed: Aug. 3, 2022

(65) Prior Publication Data
US 2023/0047804 A1 Feb. 16, 2023

(30) Foreign Application Priority Data

Aug. 12, 2021 (KR) .......................... 10-2021-0106917

(51) Int. Cl.
*B60K 35/60* (2024.01)
*B60K 35/50* (2024.01)
*B60K 35/22* (2024.01)

(52) U.S. Cl.
CPC .............. *B60K 35/60* (2024.01); *B60K 35/50* (2024.01); *B60K 35/22* (2024.01); *B60K 2360/40* (2024.01); *B60K 2360/816* (2024.01)

(58) Field of Classification Search
CPC ........ B60K 35/22; B60K 35/50; B60K 35/60; B60K 35/70; B60K 2360/40; B60K 2360/816
USPC ......................................................... 296/70
See application file for complete search history.

(56) References Cited

U.S. PATENT DOCUMENTS 8,764,091 B2 * 7/2014 Clark .................... B60K 35/50
296/70
8,939,493 B1 * 1/2015 Barthlow .............. B60R 21/045
296/72
9,927,642 B2 * 3/2018 Larry ................ G02F 1/133385

FOREIGN PATENT DOCUMENTS

KR 2010-0004917 5/2010
KR 2011-0060098 6/2011
KR 200491255 Y1 * 3/2020 ............. B60K 37/04

OTHER PUBLICATIONS

English translation of KR 20 0491255; retrieved via PatentTranslate located at www.epo.org. (Year: 2024).*
English Language Abstract of KR 2010-0004917 published May 13, 2010.
English Language Abstract of KR 1010-0060098 published Jun. 8, 2011.

* cited by examiner

*Primary Examiner* — Jason S Daniels
(74) *Attorney, Agent, or Firm* — DLA Piper LLP US

(57) ABSTRACT

A cockpit module for a vehicle comprises an instrument panel located in a partial section of a front in a vehicle, and having a plurality of mounting holes inclined inward by a preset width, and a display configured to allow a mounting shaft formed at a connection end with the instrument panel to pass through the mounting holes of the instrument panel step by step to absorb the corresponding impact when an external impact is applied to a front of the display.

18 Claims, 12 Drawing Sheets

FIG. 3
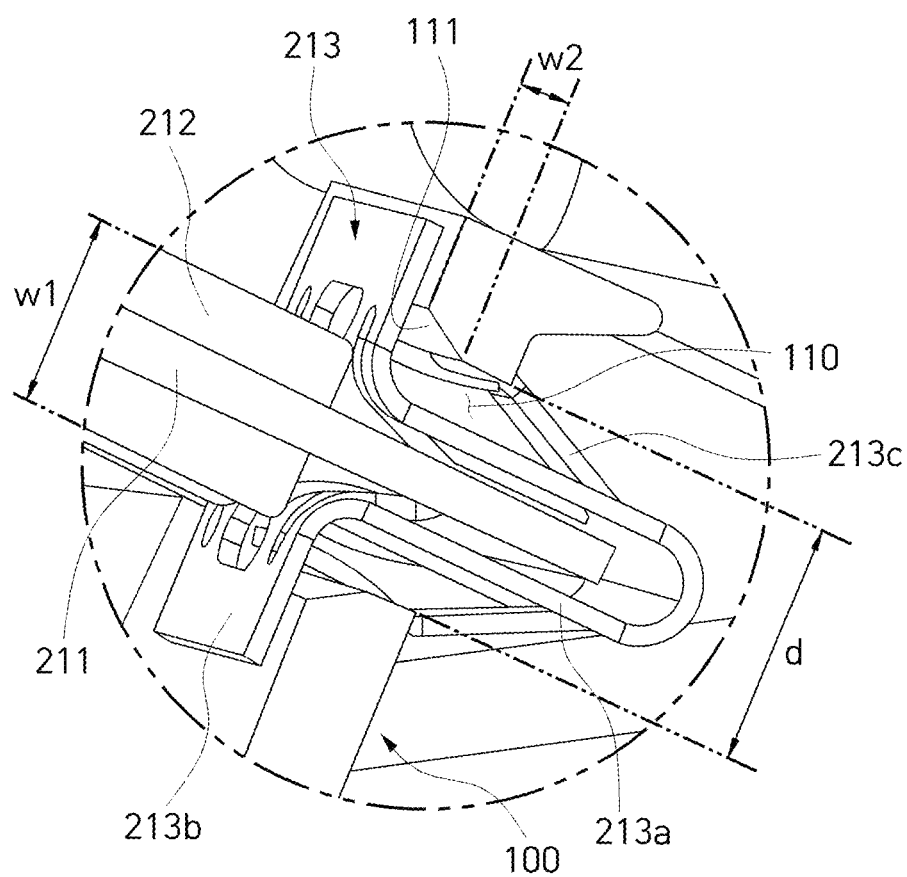
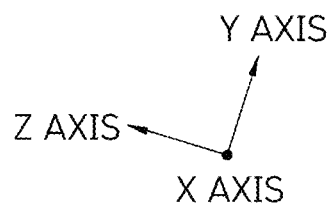

DISPLAY AND COCKPIT MODULE FOR VEHICLE INCLUDING THE SAME

CROSS-REFERENCE TO RELATED APPLICATION

This application claims priority to and the benefit of Korean Patent Application No. 10-2021-0106917, filed on Aug. 12, 2021, the disclosure of which is incorporated herein by reference in its entirety.

BACKGROUND

Field of the Invention

The present invention relates to a display and a cockpit module for a vehicle including the same.

Discussion of Related Art

In general, as the spread of electric vehicles and autonomous vehicles increases, a display located on a cockpit module for a vehicle tends to gradually become larger.

Such a trend is beneficial in that it provides convenience to occupants (including drivers, passengers, and users), but in the event of collision accidents, the large-sized display may also cause a situation more threatening to the safety of occupants than before.

As a measure against this, various legal regulations are being globally enacted, and in line therewith, an annual head impact test (hereafter referred to as 'impact test') based on automobile safety standards is also being conducted in Korea.

However, according to the related art, it is difficult to absorb the impact occurring in a mounting structure of an instrument panel (IP) during the impact test. For example, since most conventional displays are fastened in a structure screw-mounted to the instrument panel, it is difficult to absorb the impact during the impact test.

In particular, the conventional display causes a problem that sharp pieces and the like are scattered due to the corresponding impact, thereby resulting in problems that not only it is difficult to pass the corresponding regulations but also it is possible to threaten the safety of the occupants.

SUMMARY OF THE INVENTION

The present invention is directed to providing a display and a cockpit module for a vehicle including the same, capable of satisfying regulations corresponding to an impact test range, and at the same time, guaranteeing occupants' safety by improving a mounting structure of the instrument panel.

The object of the present invention is not limited to the above-mentioned objects, and other objects not mentioned herein will be clearly understood by those skilled in the art from the following description.

According to an aspect of the present invention, there is provided a cockpit module for a vehicle including an instrument panel located in a partial section of a front in a vehicle, and having a plurality of mounting holes inclined inward by a preset width, and a display configured to allow a mounting shaft formed at a connection end with the instrument panel to pass through the mounting holes of the instrument panel step by step to absorb the corresponding impact when an external impact is applied to a front of the display.

The display may include a main panel, a screen module, and an adhesive member.

A front of the main panel may be provided with the mounting shaft connected to the mounting hole in a state of being seated in an accommodation space built in the instrument panel.

The screen module may be disposed behind the main panel to display functions for various vehicle driving information as images.

The adhesive member may be formed in a foam form to bond a part of a contact portion between the main panel and the screen module.

The main panel may include a rib formed to protrude from the connection end with the instrument panel in a state of intersecting with the mounting shaft, and a leaf spring elastically fastened to the mounting hole in a state of surrounding ends of the mounting shaft and the rib.

The rib may have a relatively smaller width than a diameter of the mounting hole.

The leaf spring may include a U-shaped clip portion having an outer portion located between the mounting holes in a state in which an inner portion having an opened one surface surrounds the ends of the mounting shaft and the rib, a flange portion protruding to the outside of the opened end of the clip portion and seated around a rear side of the mounting hole; and a tightening portion protruding to the outside to be elastically deformable between the clip portion and the flange portion and snap-fit fastened to the mounting hole.

When an external impact is applied to the front of the display, the leaf spring may absorb the corresponding impact as a shape of the flange portion is deformed into the clip portion, and the flange portion may pass through the mounting holes step by step and move to the front of the vehicle in a state in which the clip portion surrounds the ends of the mounting shaft and the rib.

The display may include the main panel whose front is connected in a state of being seated in the accommodation space built in the instrument panel, and the screen module disposed behind the main panel.

The main panel may include a connection portion connected to a front center portion of the screen module, and an adhesive portion extending to the outside of the connection portion to come into surface contact with an outer portion of the screen module.

Meanwhile, according to another aspect of the present invention, there is provided a cockpit module for a vehicle including an instrument panel located at a front in a vehicle, and a display electrically connected to the instrument panel to display functions for various vehicle driving information as images.

At this point, when an external impact is applied to the front and the corresponding impact exceeds a standard external force, the display may absorb the corresponding impact as a connection bracket is independently damaged by a plurality of damage holes formed in the connection bracket coming into surface contact with the instrument panel.

The damage holes of the connection bracket may be formed along a rim of the connection bracket at intervals, and may have a total through-hole area of at least 30% of a total area of the connection bracket.

According to the present invention, a cockpit module for a vehicle can improve a mounting structure between a display and an instrument panel, thereby satisfying the regulations corresponding to the impact test range and at the same time, optimizing the design conditions.

In particular, the impact absorption structure (mounting structure) between the display and the instrument panel can secure safety even when the scattering prevention film and the Liquid Crystal Display (LCD) strengthened glass are not applied, thereby eventually simplifying the process and reducing the cost.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which:

FIG. 3 is an enlarged view of part A1 indicated in FIG. 2;

DETAILED DESCRIPTION OF EXEMPLARY EMBODIMENTS

Figure 1:
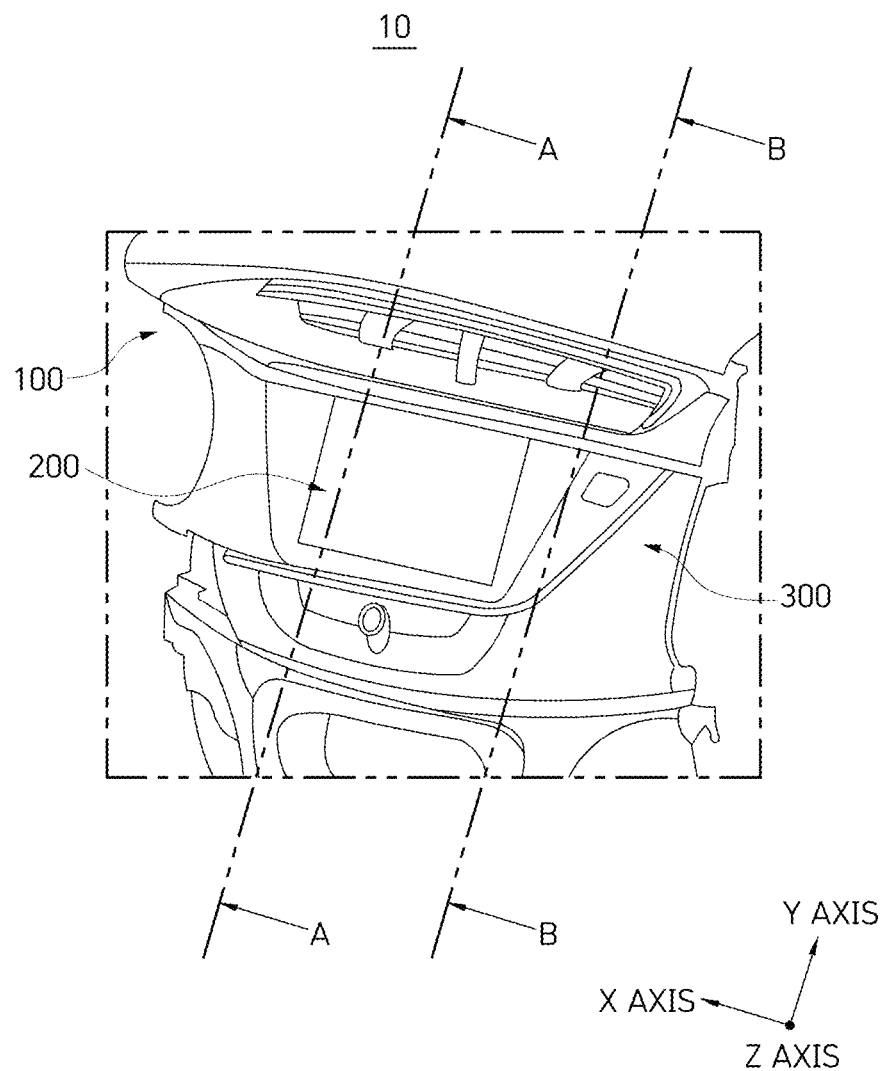
FIG. 1 is a partial perspective view schematically showing a cockpit module for a vehicle according to one embodiment of the present invention.

Advantages and features of the present invention and methods of achieving them will be made clear from embodiments described in detail below with reference to the accompanying drawings. However, the present invention is not limited to embodiments disclosed below but will be implemented in various different forms, and these embodiments are only provided so that the disclosure of the present invention will be thorough and complete and will fully convey the scope of the present invention to those skilled in the art to which the present invention pertains, and the present invention is defined by the description of the claims. Meanwhile, terms used herein are for the purpose of describing the embodiments and are not intended to limit the present invention. In the present specification, the singular forms include the plural forms as well unless the context clearly indicates otherwise. The term "comprise" or "comprising" used herein does not preclude the presence or addition of one or more other elements, steps, operations, and/or devices other than stated elements, steps, operations, and/or devices. As used in the present specification, the term "and/or" includes any one of the corresponding listed items and all combinations of one or more of them.

Hereinafter, embodiments of the present invention will be described in detail with reference to the accompanying drawings.

Coordinate System Display

X, Y, and Z axes shown in the drawings of the present invention represent a three-dimensional Cartesian coordinate system in which coordinates of points or vectors are displayed with respect to straight coordinate axes that intersect perpendicularly to each other. It may be described that for convenience of description, the X-axis is an axis directed to a width direction (lateral) with respect to a vehicle body, the Y-axis is an axis directed to upper and lower direction (ceiling, floor) of the vehicle body, and the Z axis is an axis directed to front and rear (upper and lower portions of the X and Y axes) sides in a longitudinal direction of the vehicle body in the corresponding coordinate system.

In addition, the X, Y, and Z axis directions include a positive direction and a negative direction of each axis.

A positive direction of the X-axis means a right side of the vehicle body in the width direction, and a negative direction of the X-axis means a left side of the vehicle body in the width direction.

A positive direction of the Y-axis means a ceiling direction of the vehicle body, and a negative direction of the Y-axis means a floor direction of the vehicle body.

A positive direction of the Z-axis means a rear side (rear) in the longitudinal direction of the vehicle body at a virtual origin connecting the X-axis and the Y-axis, and a negative direction of the Z-axis means a front side (front) in the longitudinal direction of the vehicle body from the origin.

The positive and negative directions of each axis may be collectively described based on the same or different specific reference points for convenience of description.

For example, according to the present invention, the positive direction of the Z-axis means the rear, and the negative direction of the Z-axis means the front, but the positive and negative directions may be defined through any one reference point, and the reference point thereof may be changed depending on each structure.

Cockpit Module for a Vehicle

FIG. 1 is a partial perspective view schematically showing a cockpit module for a vehicle according to one embodiment of the present invention.

Referring to FIG. 1, a cockpit module for a vehicle 10 according to one embodiment of the present invention is mainly characterized by applying an impact absorption structure to a portion fastened between respective components to absorb an impact on a corresponding portion struck when an external force is arbitrarily applied to a front surface (negative direction of the Z-axis) of each component like an impact test, or the impact is applied from the outside like the collision accidents, thereby securing occupants' safety.

As a measure for this, the cockpit module for a vehicle 10 including an instrument panel 100 and a display 200 has a plurality of impact-absorbing structures for each connected section.

The instrument panel 100 is located in a partial section of the front of a vehicle, and has an accommodation space in a partial section. In this case, the instrument panel 100 has a plurality of mounting holes (110 in FIG. 3) around the accommodation space.

The display 200 is formed in a structure in which a connection end with the instrument panel 100 absorbs the external impact step by step. In particular, the display 200 is formed in an impact-absorbing structure with a garnish 300 as well as the instrument panel 100, thereby effectively relieving the external impact applied to the front.

For example, when the impact is applied in the negative direction of the Z-axis, the impact-absorbing structure has a method in which the fastened portion between the respective components of the display 200 is pushed in the negative direction of the Z-axis to absorb the impact. Such an impact-absorbing structure will be described below.

Figure 2:
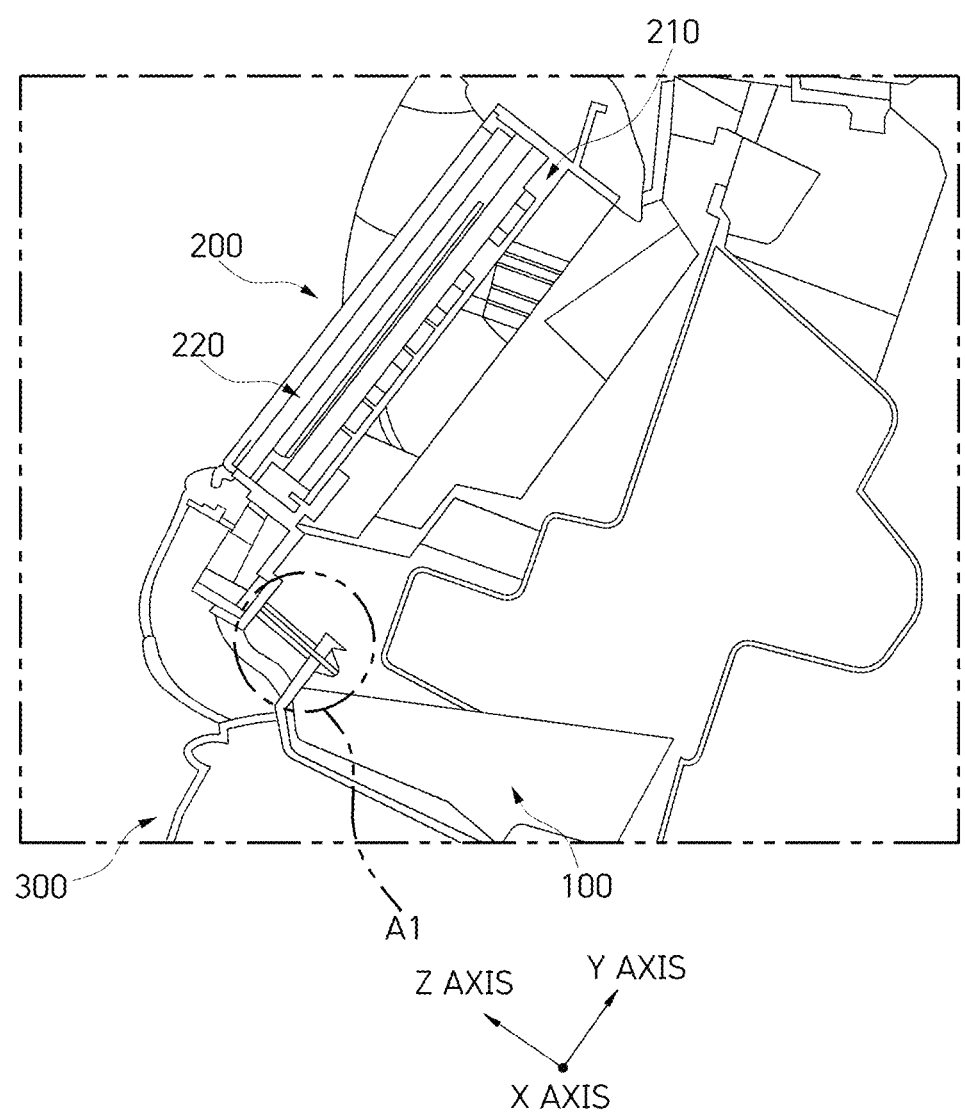
FIG. 2 is a cross-sectional view taken along line A-A indicated in FIG. 1.
Figure 4:
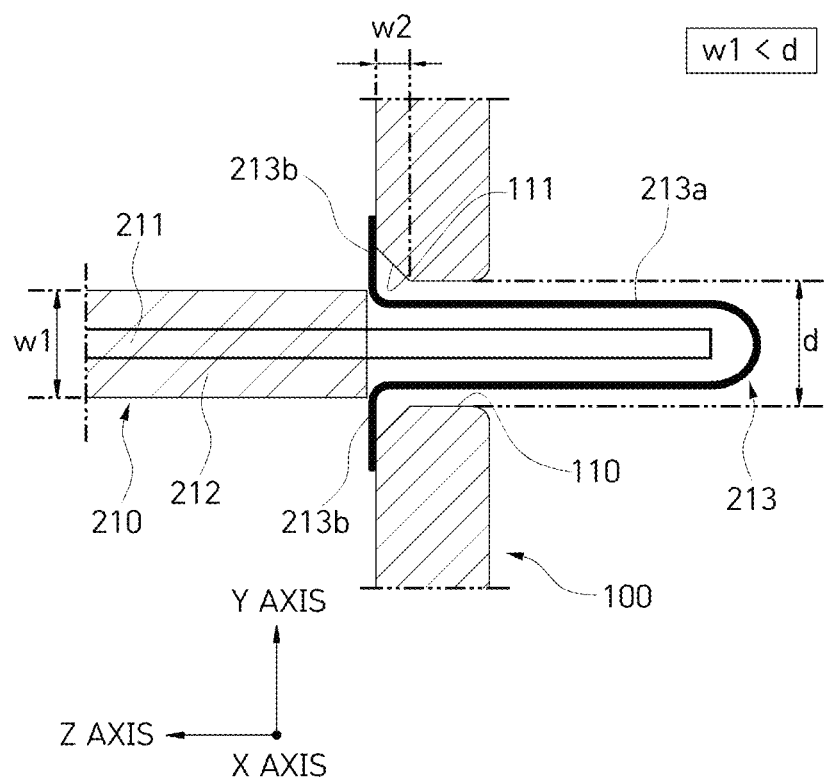
FIGS. 4 and 5 are exemplary views schematically showing a fastened structure between an instrument panel and a display shown in FIG. 3 and an embodiment thereof.
Figure 5:
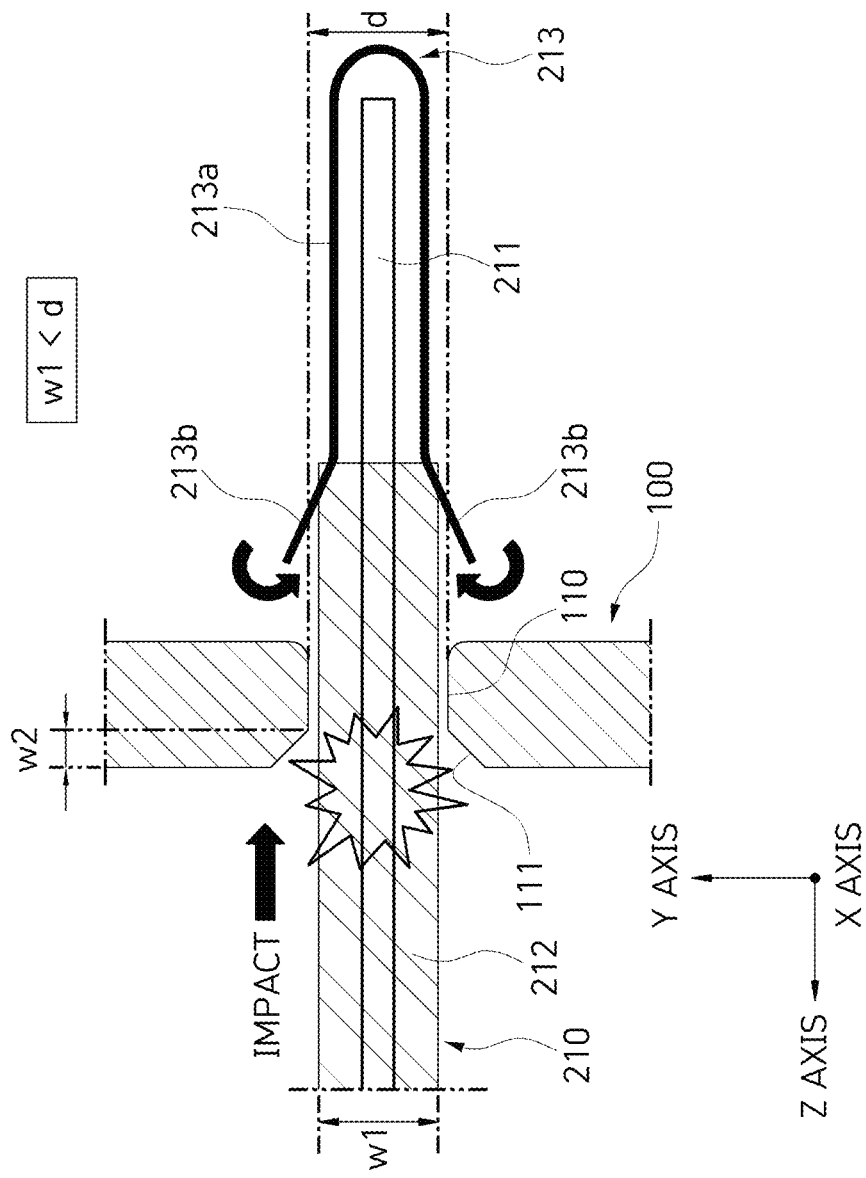

FIG. 2 is a cross-sectional view taken along line A-A indicated in FIG. 1, FIG. 3 is an enlarged view of part A1 indicated in FIG. 2, and FIGS. 4 and 5 are exemplary views schematically showing a fastened structure between an instrument panel and a display shown in FIG. 3 and an embodiment thereof.

Referring to FIGS. 2 to 5, the display 200 includes a main panel 210 and a screen module 220.

The main panel 210 is seated in the accommodation space built in the instrument panel 100. This main panel 210 includes a mounting shaft 211, a rib 212, and a leaf spring 213.

The mounting shaft 211 is formed to protrude from a front end of the main panel 210 connected to the instrument panel 100. This mounting shaft 211 has a structure inserted through the mounting hole 110.

The rib 212 is formed to protrude from the front end of the main panel 210 connected to the instrument panel 100. At this point, the rib 212 intersects with the mounting shaft 211.

The leaf spring 213 is inserted into the mounting hole 110 in a state of surrounding the mounting shaft 211 and the rib 212 to serve to elastically fasten the instrument panel 100 and the display 200.

The leaf spring 213 includes a clip portion 213*a*, a flange portion 213*b*, and a tightening portion 213*c*.

The clip portion 213*a* has an outer portion located between the mounting holes 110 in a state in which the inner side having an opened one surface surrounds the ends of the mounting shaft 211 and the rib 212.

As shown in FIGS. 3 to 5, the clip portion 213*a* is formed in a U-shape, which is only one embodiment, and the clip portion 213*a* of the present invention is not limited to such a shape. For example, since a main function of the clip portion 213*a* is to actually tighten the ends of the mounting shaft 211 and the rib 212, the clip portion 213*a* may be formed in various shapes (e.g., V-shape and W-shape) capable of performing the corresponding function according to the form associated with surrounding structures.

The flange portion 213*b* protrudes to the outside of the opened end of the clip portion 213*a*, and is seated around the rear side of the mounting hole 110.

The tightening portion 213*c* protrudes to the outside to be elastically deformable between the clip portion 213*a* and the flange portion 213*b*, and is snap-fit fastened to the mounting hole 110.

For example, as shown in FIG. 3, the tightening portion 213*c* protrudes to the outside of a central portion of the clip portion 213*a*, and has a '<' shape on the left (negative direction of the Y-axis), and a '>' shape on the right side (positive direction of the Y-axis). Since the apex of the tightening portion 213*c* protrudes to both sides with respect to the clip portion 213*a*, the tightening portion 213*c* basically maintains the tension toward both sides, but when the tightening portion 213*c* is inserted into the mounting hole 110 in a state of surrounding the mounting shaft 211, the tightening portion 213*c* is bent in an inner direction of the clip portion 213*a*. When the leaf spring 213 is inserted up to a certain depth of the mounting hole 110, the tightening portion 213*c* is bent in an outward direction of the clip portion 213*a* again and comes into surface contact with the inner surface of the mounting hole 110, and at the same time, allows the leaf spring 213 to be stably fitted into the mounting hole 110.

Here, the plurality of mounting holes 110 formed in some sections of the instrument panel 100 coupled to the display 200 have an inclined surface 111 inclined inward by a preset width w2.

The inclined surface 111 having the corresponding width w2 has an inclined angle within a range of an acute angle. When the display 200 is fastened to the mounting hole 110 in the negative direction of the Z-axis, the inclined surface 111 may induce a smooth snap-fit fastening so that the tightening portion 213*c* may be easily fastened to slide into the mounting hole 110.

When an external force is applied in the negative direction of the Z-axis toward the display 200, as shown in FIG. 5, the inclined surface 111 induces the deformation of the flange portion 213*b* so that the flange portion 213*b* of the leaf spring 213 is deformed inward to pass through the mounting hole 110. In addition, by making a width w1 of the rib 212 smaller than or equal to a diameter d of the mounting hole 110, it is possible to induce the flange portion 213*b* to be deformed into the clip portion 213*a*. In other words, when the rib 212 transmits a pressure applied in the negative direction of the Z-axis to the flange portion 213*b* with the flange portion 213*b* interposed therebetween, the flange portion 213*b* may be deformed into the clip portion 213*a* along the inclined surface 111 due to the pressure. Through the deformation of the flange portion 213*b*, the corresponding impact may be absorbed.

When an external impact is applied to a front (negative direction of the Z-axis) of the display 200, as a result, the display 200 effectively absorbs the corresponding impact (reduction in the amount of impact due to the extension of an impact time) because the mounting shaft 211 formed at the connection end with the instrument panel 100 passes through the mounting holes 110 through the leaf spring 213 step by step.

The screen module 220 is disposed behind the main panel 210 to display functions for various vehicle driving information as images.

Figure 6:
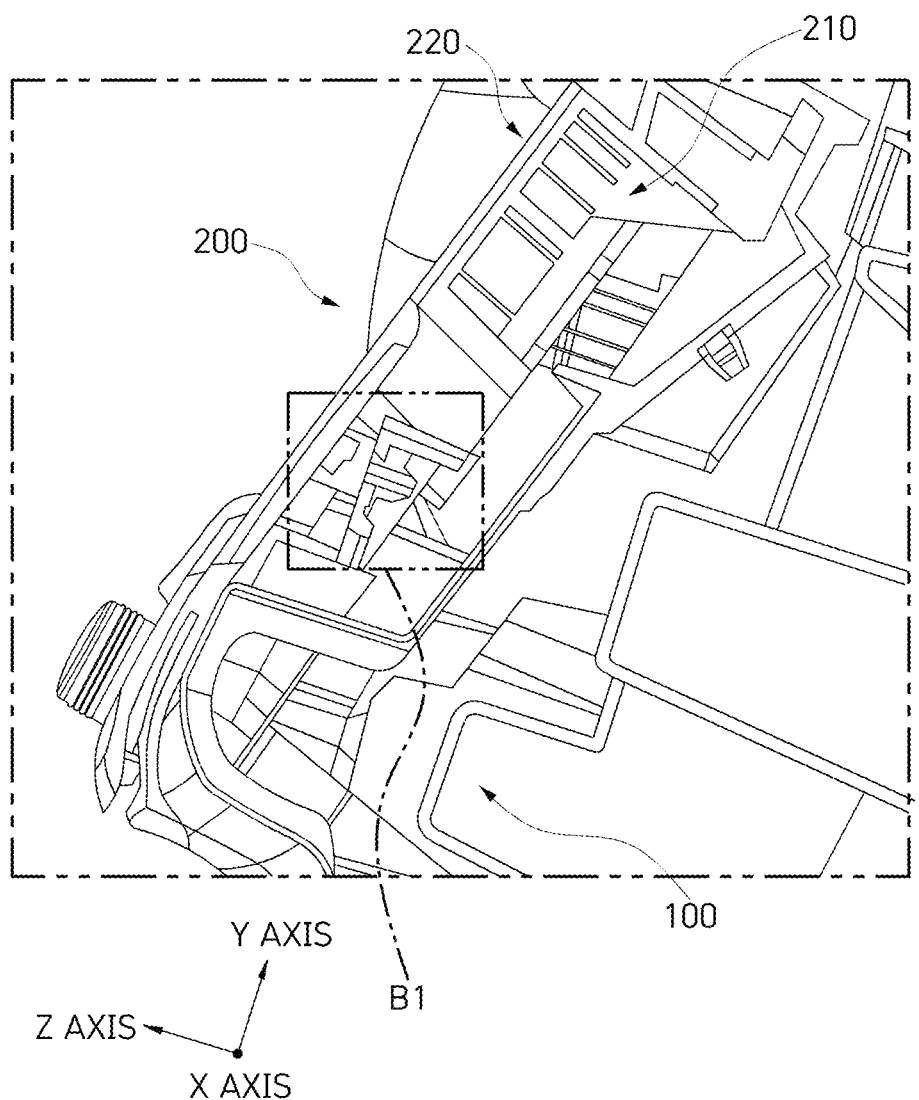
FIG. 6 is a cross-sectional view taken along line B-B indicated in FIG. 1.
Figure 7:
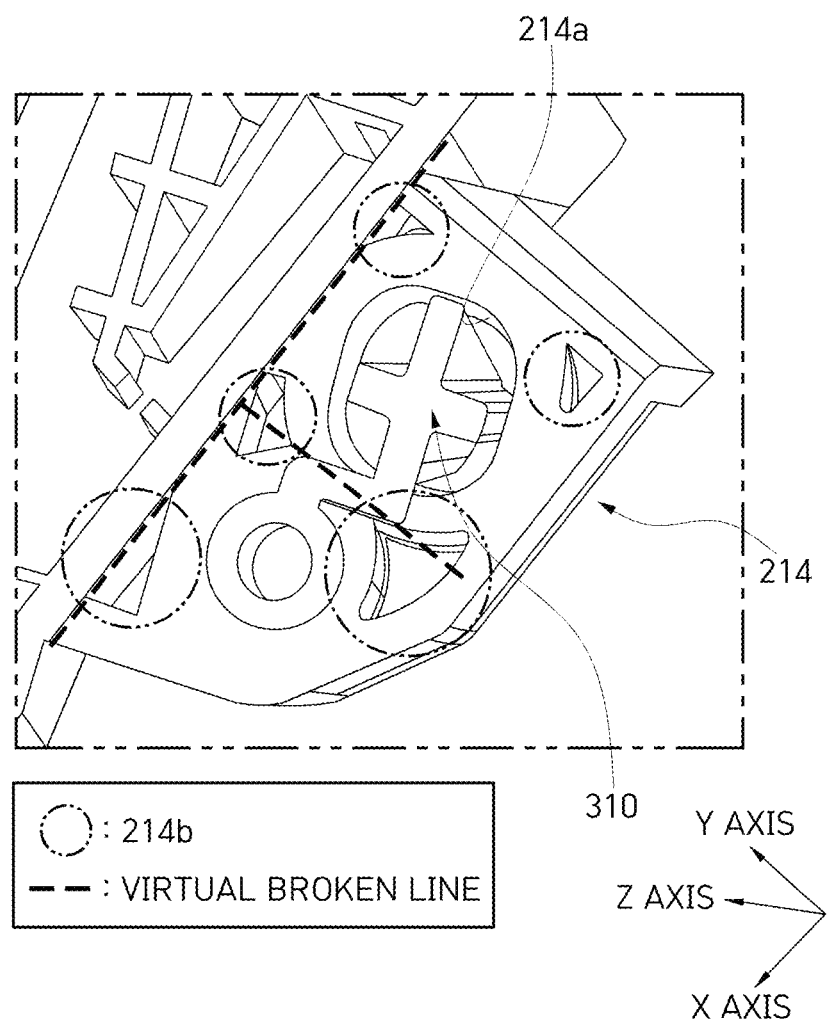
FIG. 7 is an enlarged view of part B1 indicated in FIG. 6.
Figure 8:
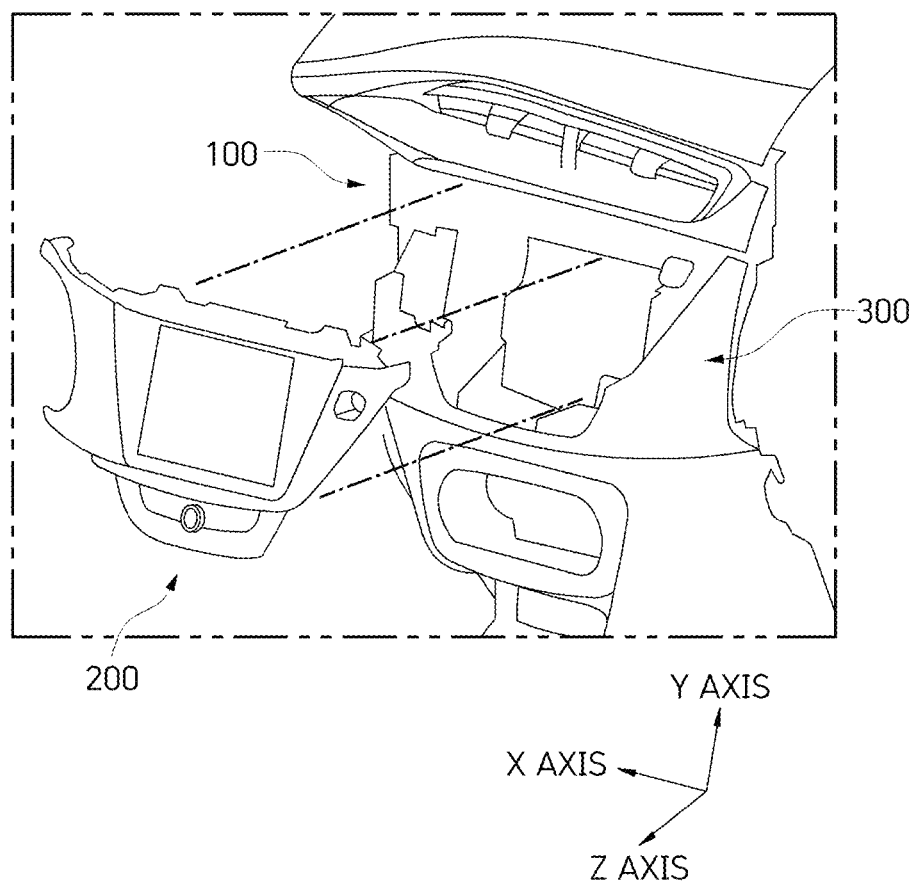
FIG. 8 is an exploded perspective view showing a fastening relationship between the instrument panel and the display in the cockpit module for a vehicle according to one embodiment of the present invention.

FIG. 6 is a cross-sectional view taken along line B-B indicated in FIG. 1, FIG. 7 is an enlarged view of part B1 indicated in FIG. 6, and FIG. 8 shows a fastening relationship between the instrument panel and the display in the cockpit module for a vehicle according to one embodiment of the present invention.

Referring to FIGS. 6 to 8, the main panel 210 includes a connection bracket 214 fastened to a section coming into contact with the garnish 300.

When the external impact is applied to the front (negative direction of the Z-axis) of the display 200, the connection bracket 214 is damaged by itself due to a plurality of damage holes 214*b* formed along a rim at intervals to absorb the corresponding impact.

In other words, when the external impact is applied to the front (negative direction of the Z-axis) of the display 200 and the corresponding impact exceeds a standard external force, the connection end with a garnish assembling portion 310 (virtual broken line in FIG. 7) is damaged to absorb the corresponding impact.

For example, as shown in FIG. 7, the damage holes 214*b* of the connection bracket 214 are formed along a rim of the connection bracket 214 at intervals. At this point, the damage holes 214*b* may have a total through-hole area of at least 30% of a total area of the connection bracket 214. Here, the total through-hole area means a total area of the damage holes 214b.

When the total area of the damage holes 214b is less than 30% of the total area of the connection bracket 214, the connection bracket 214 is not damaged by the external impact applied to the display 200, and thus it may be difficult to absorb the corresponding impact.

On the other hand, when the total area of the damage holes 214b is 50% or more (a number according to one example and may vary depending on the total area of the connection bracket) of the total area of the connection bracket 214, there may be a problem with its durability.

Accordingly, the damage holes 214b may have the total through-hole area of at least 30% to less than 50% of the total area of the connection bracket 214.

As a result, the connection bracket 214 serves to absorb the external impact applied to the display 200 while being independently damaged along the virtual broken line.

Display (AVN)

Figure 9:
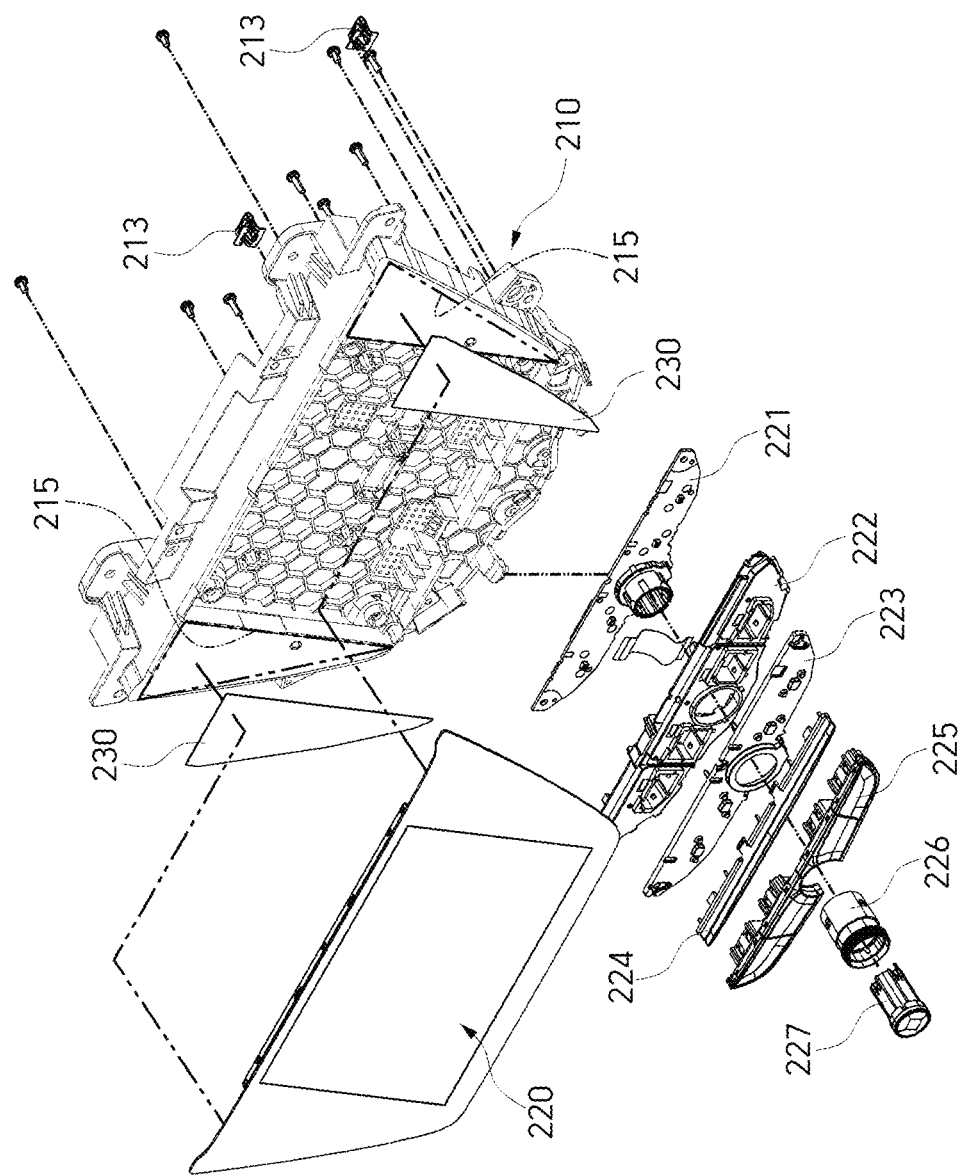
FIG. 9 is an exploded perspective view showing a fastening relationship between components of the display according to one embodiment of the present invention.

FIG. 9 is an exploded perspective view showing a fastening relationship between components of the display according to one embodiment of the present invention.

Referring to FIG. 9, the display 200 has an impact absorbing structure to absorb the impact on the occupant's head in the event of collision accidents.

To this end, the display 200 largely includes the main panel 210, the screen module 220, and an adhesive member 230.

The adhesive member 230 bonds a part of a contact portion between the main panel 210 and the screen module 220, and may be formed in a foam form. A main function of the adhesive member 230 is to prevent imbalance when the main panel 210 and the screen module 220 are assembled.

At this point, the adhesive member 230 may be used by extending up to a region where there is no problem when the main panel 210 and the screen module 220 are assembled in terms of the structure.

In other words, the adhesive member 230 may bond a part of the contact portion between the main panel 210 and the screen module 220 within a range in which they do not separate from each other due to an external impact based on the experimental data values.

Among the above configuration, the screen module 220 includes a printed circuit board 221, an elastic pad 222, a button bank 223, a deco button 224, a button assembly 225, a knob 226, and a power button 227, and the corresponding components are not a main feature of the present invention, and thus the detailed description thereof will be also omitted.

Figure 10:
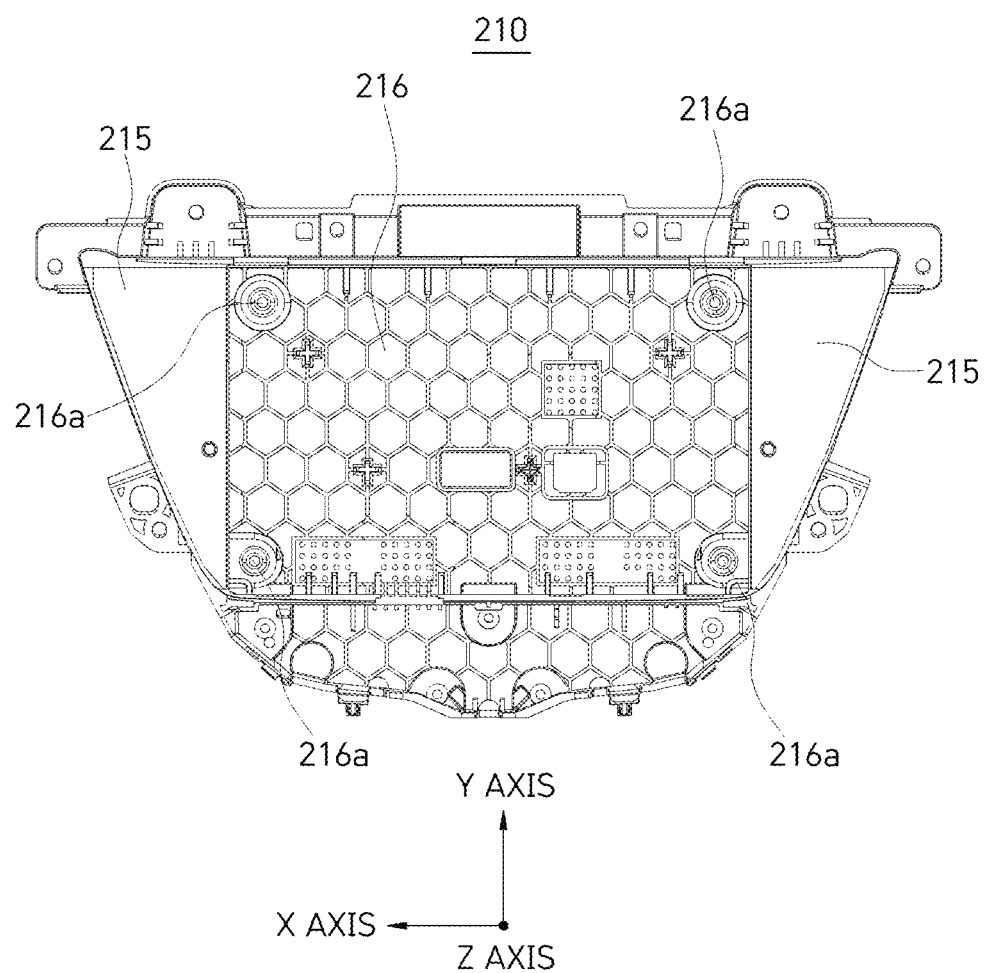
FIG. 10 is a front view schematically showing a main panel in the display according to one embodiment of the present invention.

FIG. 10 is a front view schematically showing a main panel in the display according to one embodiment of the present invention.

Referring to FIG. 10, the main panel 210 includes a connection portion 216 and an adhesive portion 215.

The connection portion 216 is a portion connected to a front center portion of the screen module 220.

The adhesive portion 215 extends to the outside of the connection portion 216 to come into surface contact with an outer portion of the screen module 220. The adhesive portion 215 is a region to which the adhesive member 230 of FIG. 9 is attached. When a screw (not shown) is assembled in an assembling hole 216a in FIG. 10, it is difficult to absorb an external impact, but when a separate elastic member (not shown) having its own elasticity and a thread on an outer circumferential surface is assembled, such a structure may be an impact-absorbing structure in itself.

Figure 11:
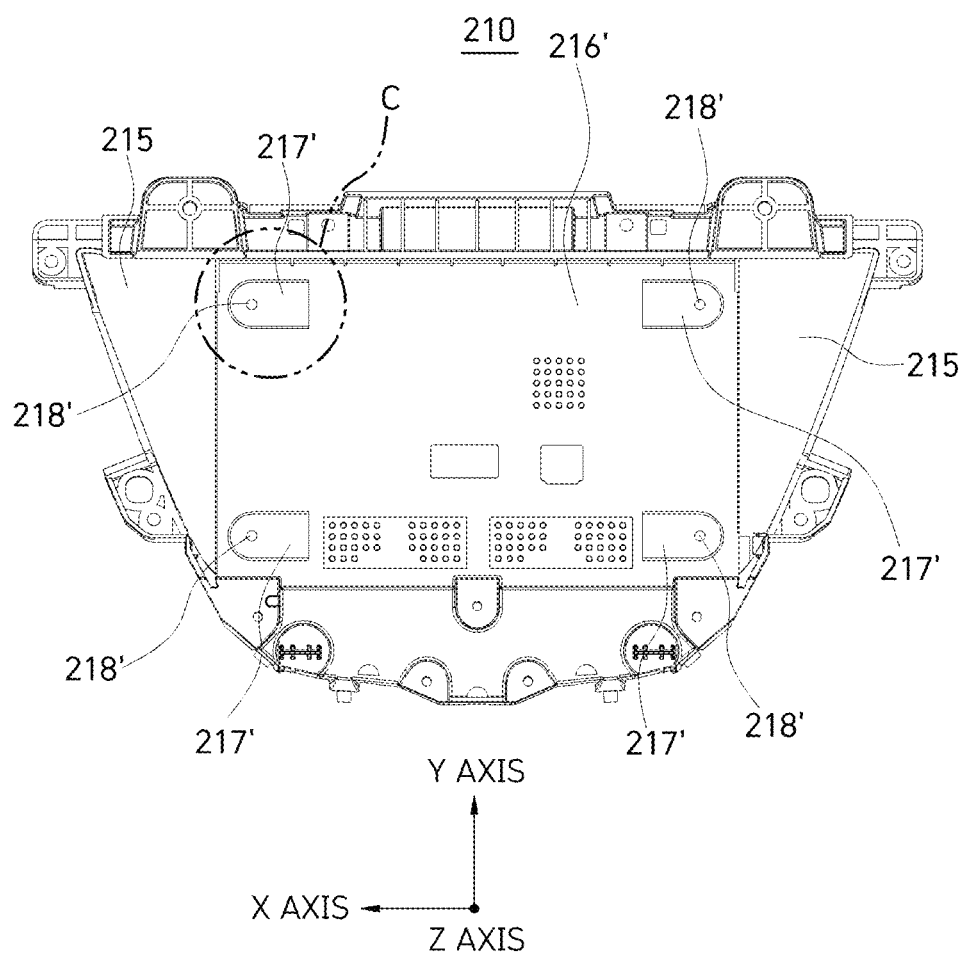
FIG. 11 is a front view schematically showing a main panel in a display according to another embodiment of the present invention.
Figure 12:
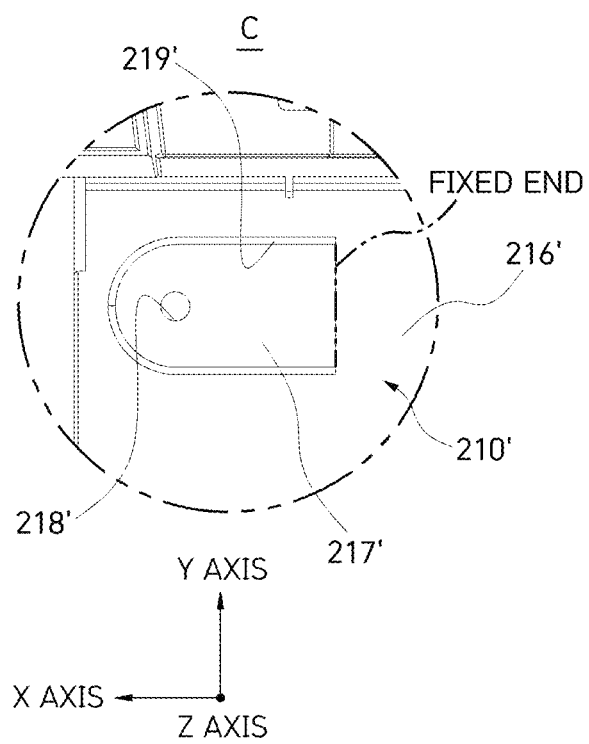
FIG. 12 is a partial enlarged view of part C indicated in FIG. 11.

FIG. 11 is a front view schematically showing a main panel in a display according to another embodiment of the present invention, and FIG. 12 is a partial enlarged view of part C indicated in FIG. 11.

In a main panel 210' shown in FIGS. 11 and 12, tension panels 217' are formed at upper, lower, and rear portions (positive direction of the Z-axis) of a connection part 216'. At this point, the tension panel 217' is located in a panel hole 219' having a size greater than that of the tension panel 217', and has a structure that is deformed in the negative direction of the Z-axis with respect to a fixed end to mitigate the corresponding impact when receiving an external impact.

An assembling hole 218' is formed in the tension panel 217', and even when a screw is assembled in the assembling hole 218', the tension panel 217' itself may be deformed to absorb the impact.

In addition, the tension panel 217' is significant in that it is possible to prevent imbalance even when the main panel 210' and the screen module 220 are assembled.

The present invention is not limited to the above-described embodiments, and may be variously modified and practiced without departing from the technical spirit of the present invention.

What is claimed is:

1. A cockpit module for a vehicle, comprising:
  an instrument panel located in a front section of the vehicle and having a plurality of mounting holes, a part of a wall surface of one of the mounting holes being an inclined surface inclined inwardly by a preset width, the preset width being measured along an opening direction of the one of the mounting holes; and
  a display configured to allow a mounting shaft formed at a connection end to pass through the mounting holes of the instrument panel to absorb impact when an external impact is applied to a front of the display.

2. The cockpit module of claim 1, wherein the display includes:
  a main panel with a front provided with the mounting shaft connected to the mounting holes when seated in an accommodation space built in the instrument panel;
  a screen module disposed behind the main panel; and
  an adhesive member configured to bond a part of a contact portion between the main panel and the screen module.

3. The cockpit module of claim 2, wherein the main panel includes:
  a rib formed to protrude from a connection end when the instrument panel is intersecting with the mounting shaft; and
  a leaf spring elastically fastened to the mounting hole for surrounding ends of the mounting shaft and the rib.

4. The cockpit module of claim 3, wherein the rib has a relatively smaller width than a diameter of the mounting hole.

5. The cockpit module of claim 3, wherein the leaf spring includes:
  a U-shaped clip portion having an outer portion located between the mounting holes when an inner portion having an opened one surface surrounds the ends of the mounting shaft and the rib;
  a flange portion protruding outside of the opened end of the clip portion and seated around a rear side of the mounting hole; and
  a tightening portion protruding outside and being elastically deformable between the clip portion and the flange portion and snap-fit fastened to the mounting hole.

6. The cockpit module of claim 5, wherein the leaf spring absorbs the impact as a shape of the flange portion is deformed into the clip portion when the external impact is applied to the front of the display, and the flange portion passes through the mounting holes and moves to a front side of the vehicle when the clip portion surrounds the ends of the mounting shaft and the rib.

7. The cockpit module of claim 1, wherein the display includes:
 a main panel with a front is seated in an accommodation space built in the instrument panel; and
 a screen module disposed behind the main panel,
 wherein the main panel includes:
 a connection portion connected to a front center portion of the screen module; and
 an adhesive portion extending outside of the connection portion and in surface contact with an outer portion of the screen module.

8. A cockpit module for a vehicle, comprising:
 an instrument panel located at a front of the vehicle; and
 a display electrically connected to the instrument panel to display functions for various vehicle driving information as images,
 wherein when an external impact is applied to the front and a corresponding impact exceeds a standard external force, the display absorbs the corresponding impact as a connection bracket is independently damaged by a plurality of damage holes formed in the connection bracket and coming into surface contact with the instrument panel; and
 wherein the damage holes of the connection bracket are formed at intervals along a rim of the connection bracket and have a total through-hole area of at least 30% of a total area of the connection bracket.

9. The cockpit module of claim 8, wherein the display includes a leaf spring configured to surround an end of a mounting shaft so that the mounting shaft protrudes from a connection end when the instrument panel passes through a plurality of mounting holes to absorb impact applied to a front of the display.

10. The cockpit module of claim 9, wherein the leaf spring includes:
 a U-shaped clip portion having an outer portion located between the mounting holes when an inner portion having an opened one surface surrounds the ends of the mounting shaft;
 a flange portion protruding outside of the opened end of the clip portion and seated around a rear side of the mounting hole; and
 a tightening portion protruding outside and being elastically deformable between the clip portion and the flange portion and snap-fit fastened to the mounting hole.

11. The cockpit module of claim 10, wherein the leaf spring absorbs the corresponding impact as a shape of the flange portion is deformed into the clip portion when the external impact is applied to the front of the display, and the flange portion passes through the mounting holes and moves to a front side of the vehicle when the clip portion surrounds the ends of the mounting shaft.

12. A display comprising:
 a main panel having a mounting shaft fitted into and fastened to a plurality of mounting holes formed in an instrument panel located at a front in a vehicle; and
 a screen module disposed behind the main panel to display functions for various vehicle driving information as images,
 wherein when an external impact is applied to a front of the screen module, the mounting shaft of the main panel passes through the mounting holes of the instrument panel step by step to absorb a corresponding impact; and
 wherein the main panel includes:
 a connection portion connected to a front center portion of the screen module; and
 an adhesive portion extending outside of the connection portion and in surface contact with an outer portion of the screen module.

13. The display of claim 12, wherein the main panel includes:
 a rib formed to protrude from a connection end when the instrument panel intersects with the mounting shaft; and
 a leaf spring elastically fastened to the mounting hole when surrounding ends of the mounting shaft and the rib.

14. The display of claim 13, wherein the leaf spring includes:
 a U-shaped clip portion having an outer portion located between the mounting holes when an inner portion having an opened one surface surrounds the ends of the mounting shaft and the rib;
 a flange portion protruding outside of the opened end of the clip portion and seated around a rear side of the mounting hole; and
 a tightening portion protruding outside and being elastically deformable between the clip portion and the flange portion, and snap-fit fastened to the mounting hole.

15. The display of claim 13, wherein the rib has a relatively smaller width than a diameter of the mounting hole.

16. The display of claim 13, wherein the connection portion includes:
 a plurality of panel holes formed to pass through some sections connected to the front center portion of the screen module; and
 a tension panel having an extended fixed end in a partial section inside the panel hole, having a size smaller than a diameter of the panel hole, and having a predetermined assembling hole,
 wherein the tension panel is deformed to a front of the panel hole around the fixed end to absorb the corresponding impact when the external impact is applied to the screen module.

17. The display of claim 12, wherein the main panel includes a connection bracket fastened to a section in contact with a garnish of the vehicle, and
 the connection bracket is damaged by a plurality of damage holes formed at intervals along a rim to absorb the corresponding impact when the external impact is applied to the front of the display.

18. The display of claim 17, wherein the damage holes of the connection bracket have a total through-hole area of at least 30% of a total area of the connection bracket.

* * * * *